(12) United States Patent
Luo et al.

(10) Patent No.: US 10,289,100 B2
(45) Date of Patent: May 14, 2019

(54) TRAJECTORY PLANNING SYSTEM FOR INTEGRATED COMPUTER NUMERICAL CONTROL (CNC) MACHINE, TRAJECTORY PLANNING DEVICE, TRAJECTORY PLANNING METHOD, AND COMPUTER PROGRAM THEREOF

(71) Applicant: National Taiwan University, Taipei (TW)

(72) Inventors: Ren-C Luo, Taipei (TW); Yi-Wen Peng, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 537 days.

(21) Appl. No.: 14/751,123

(22) Filed: Jun. 25, 2015

(65) Prior Publication Data
US 2016/0224018 A1   Aug. 4, 2016

(30) Foreign Application Priority Data
Jan. 29, 2015   (TW) .............................. 104102963 A

(51) Int. Cl.
*G05B 19/416*   (2006.01)
*G06F 19/00*   (2018.01)

(52) U.S. Cl.
CPC .. *G05B 19/416* (2013.01); *G05B 2219/36585* (2013.01); *G05B 2219/42342* (2013.01);
(Continued)

(58) Field of Classification Search
CPC ........ G05B 19/416; G05B 2219/36585; G05B 2219/42342; G05B 2219/43009; G05B 2219/43146
(Continued)

(56) References Cited

U.S. PATENT DOCUMENTS 5,373,221 A * 12/1994 McGee ................ G05B 19/416
                                                      318/568.11
5,955,856 A *  9/1999 Sato .................... G05B 19/4105
                                                      318/560

(Continued)

OTHER PUBLICATIONS

Constantinescu et al., "Smooth and Time-Optimal Trajectory Planning for Industrial Manipulators along Specified Paths", Journal of Robotic Systems, 2000, 17pg.*

(Continued)

*Primary Examiner* — Ryan D. Coyer
(74) *Attorney, Agent, or Firm* — Lynette Wylie; Apex Jurls, PLLC.

(57) ABSTRACT

The trajectory planning system for integrating a computer numerical control (CNC) machine, trajectory planning device, trajectory planning method, and computer program thereof are provided. The aforementioned trajectory planning device includes a determining module. The determining module configures the related processing speed or processing acceleration based on type of the processing segment so as to provide a processing setting. Furthermore, the aforementioned trajectory planning device determines the processing segment whether the linear or circular segment and plans the tangent or normal acceleration of related processing segment so as to optimize the processing setting and finish the high order processing trajectory planning.

5 Claims, 4 Drawing Sheets

(52) U.S. Cl.
CPC .............. *G05B 2219/43009* (2013.01); *G05B 2219/43146* (2013.01)

(58) Field of Classification Search
USPC ........................................................ 700/188
See application file for complete search history.

(56) References Cited

U.S. PATENT DOCUMENTS

| | | | | |
|---|---|---|---|---|
| 6,140,791 | A * | 10/2000 | Zhang | G05B 19/416 318/560 |
| 6,495,791 | B2 * | 12/2002 | Hunter | B23K 26/04 219/121.6 |
| 6,662,063 | B2 * | 12/2003 | Hunter | B23K 26/04 257/E21.596 |
| 2005/0279739 | A1 * | 12/2005 | Bruland | B23K 26/0613 219/121.69 |
| 2005/0281101 | A1 * | 12/2005 | Bruland | B23K 26/0613 365/200 |
| 2008/0029491 | A1 * | 2/2008 | Johnson | B23K 26/0853 219/121.6 |
| 2009/0011614 | A1 * | 1/2009 | Bruland | B23K 26/067 438/795 |
| 2010/0087948 | A1 * | 4/2010 | Yamaguchi | G05B 19/4061 700/178 |
| 2011/0166693 | A1 * | 7/2011 | Nishibashi | G05B 19/4103 700/187 |
| 2012/0109359 | A1 * | 5/2012 | Mizuno | G05B 19/41865 700/173 |

OTHER PUBLICATIONS

Macfarlane et al., "Jerk-Bounded Manipulator Trajectory Planning: Design for Real-Time Applications", IEEE, 2003, 11pg.*
Munoz et al., "Mobile Robot Trajectory Planning With Dynamic and Kinematic Constraints", IEEE, 1994, 6pg.*
Suh et al., "Development of an Automatic Trajectory Planning System (ATPs) for Spray Painting Robots", IEEE, 1991, 8pg.*
Ren C. Luo, "Combined Multiaxis Machine Tool with Robot," Jul. 31, 2014, 1 page, Taipei World Trade Center Nangang Exhibition Hall, Taiwan.

* cited by examiner

TRAJECTORY PLANNING SYSTEM FOR INTEGRATED COMPUTER NUMERICAL CONTROL (CNC) MACHINE, TRAJECTORY PLANNING DEVICE, TRAJECTORY PLANNING METHOD, AND COMPUTER PROGRAM THEREOF

This application claims priority benefit of TW Patent Application Ser. No. 104102963 filed 2015 Jan. 29 which is hereby incorporated herein by reference its entirety.

BACKGROUND OF THE INVENTION

1. Field of the Invention

The present invention is related to a trajectory planning system for integrated computer numerical control (CNC) machine, trajectory planning device, a trajectory planning method, and a computer program product thereof. More particularly, the present invention is related to a trajectory planning system, a trajectory planning device, a trajectory planning method, and a computer program product thereof which can promote processing velocity.

2. Description of the Prior Art

In automatic manufacturing industry, the trajectory planning issue affects the manufacture quality and manufacture times deeply. When the structure of processing product becomes more and more complex, it may raise the processing velocity variance of the processing trajectory. For planning aforementioned high order trajectory planning, present CNC machine needs to adjust the trajectory processing velocity constantly and causes the excessive velocity variance. However, the excessive velocity variance will reduce the manufacture speed and manufacture quality.

To solve aforementioned trajectory planning problem, prior art provides a NURBS (Non-Uniform Rational B-Splines) model to synthesis high order processing trajectory. However, only few of high order controllers support NURBS algorithm. Therefore, for processing the high order processing trajectory, the mechanical industry needs to replace existing CNC controller, and thus increases the overall manufacture costs.

In summary, providing a technical means which can plan high order trajectory and can be applied in normal controller is a technical issue need to be solved in the technical field.

SUMMARY OF THE INVENTION

To solve the previous technical problems, one objective of the present application is providing trajectory planning system for integrated computer numerical control (CNC) machine, trajectory planning device, trajectory planning method, and computer program product thereof.

To achieve the aforementioned objective, the present application provides a trajectory planning device for configuring processing trajectory. Aforementioned device configures a processing velocity parameter or processing velocity parameter of a related processing segment according to segment type of the processing segment. And the CNC machine operates the mechanical processing according to the smoothed processing acceleration so as to promote manufacturing quality and manufacturing speed.

To achieve the aforementioned objective, the present application provides a trajectory planning method for configuring processing trajectory. The aforementioned method comprises following steps: configuring a processing velocity parameter or a processing acceleration parameter of a related processing segment according to segment type of the processing segment so as to provide a processing trajectory.

To achieve the aforementioned objective, the present application provides a computer program product for configuring processing trajectory. While loading and executing the computer program product, the computer device is able to accomplish steps of the aforementioned method.

To achieve the aforementioned objective, the present application provides a trajectory planning configuring system which integrates a computer numerical control (CNC) machine. The aforementioned system comprises a CNC machine, and trajectory planning device. The trajectory planning device connects with the CNC machine and configures the CNC machine executing the processing operation according to the processing setting.

In summary, the technique feature of present application analyzes each segment type of processing segment to adjust the processing velocity or the acceleration, and uses a general controller that is able to provide smoothly processing trajectory.

BRIEF DESCRIPTION OF THE DRAWINGS

For a better understanding of the aforementioned embodiments of the invention, as well as, additional embodiments thereof, reference should be made to the Description of Embodiments below, in conjunction with the following drawings in which like reference numerals refer to corresponding parts throughout the figures.

DETAILED DESCRIPTION OF THE PREFERRED EMBODIMENT

The following description of embodiments of the present invention is illustrative, and not intended to limit the scope, of the present invention.

Figure 1:
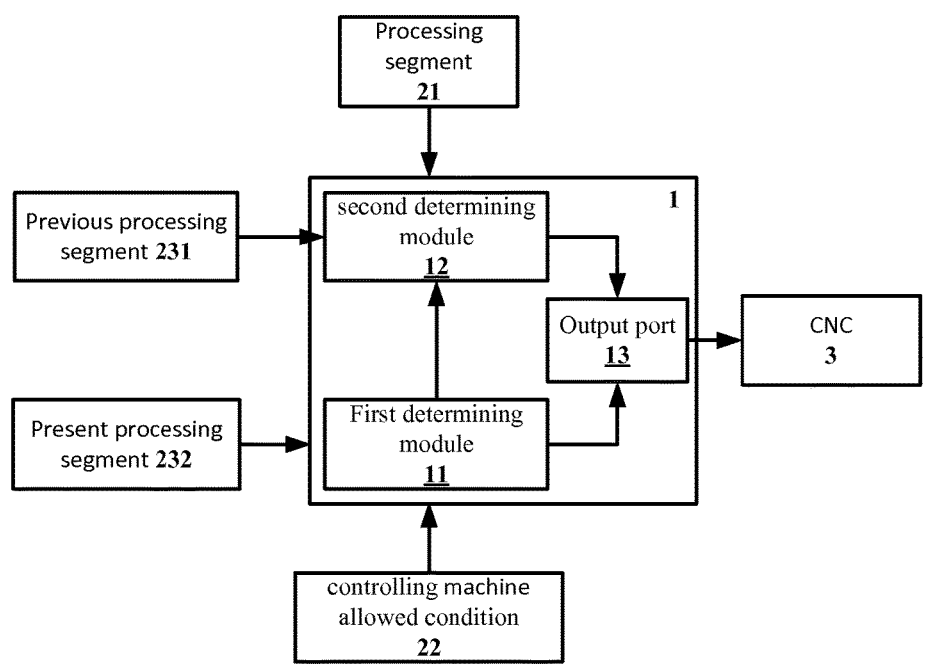
FIG. 1 shows a block diagram of the trajectory planning device of the first embodiment of present application.

FIG. 1 shows a block diagram of a trajectory planning device for configuring a processing trajectory according to a first embodiment of the present invention. The trajectory planning device 1 is a controller of the CNC machine. After acquiring a processing path, the trajectory device 1 divides the processing path to a plurality of processing segments 21, configures the processing velocity of acceleration of the related processing segment 21 according to segment type of the present processing segment, and then provides a processing setting by which the CNC machine executes the processing trajectory.

The aforementioned processing segment 21 comprises processing location information, velocity information or acceleration information, etc. In the present embodiment, the processing segment may be a linear segment or a curved segment. The processing setting comprises previous segment processing setting 231 and present segment processing setting 232.

Furthermore, when the trajectory planning device 1 acquired processing position, velocity, and acceleration of present processing segment, the internal first determining module 11 determines the present setting value whether exceeding the controlling machine allowed condition 22.

The aforementioned allowed condition 22 comprises allowed velocity parameter, allowed acceleration parameter, etc. The trajectory planning device 1 outputs the processing setting to the CNC machine 3 by the output port 13 when the present setting doesn't exceed the allowed condition 22. While the present setting exceeds the allowed condition 22, the second determining module 12 optimizes and assigns new processing velocity/acceleration to the CNC machine 3 according to the processing position, processing velocity, and processing acceleration of the present and previous processing segments.

Compared with the prior art, using the NURBS to synthesize the processing trajectory from processing path, device 1 of present application divides and planes the processing path into a plurality of processing segments 21, including linear segment (CNC code: G01), and curved segment (CNC code: G02/G03), then the trajectory planning device 1 optimizes and adjusts whole processing segments. For example, while the trajectory planning device 1 determines the processing segment 21 is linear segment, then configures the tangent acceleration of the processing velocity of processing segment 21; while the trajectory planning device 1 determines the processing segment 21 is curved segment, and then configures the tangent acceleration and normal acceleration. In another one embodiment, aforementioned normal acceleration (acceleration$_{normal}$) may be expressed by the Equation (1).

$$\text{acceleration}_{normal} = \frac{\|\vec{v} \cdot e_t^2\|}{\rho} \qquad \text{Eq (1)}$$

Wherein, v is tangent velocity of the curved segment, $\rho$ is curvature radius of the curved segment, and $e_t$ is a unit vector at a tangent direction of the curved segment.

The complex processing path usually comprises large number of linear segments and curved segments. Therefore, the trajectory planning device 1 further configures the processing velocity parameter ($v_i$) of present processing segment according to the velocity parameter of previous processing segment and velocity parameter of present processing segment.

In another embodiment, the setting of processing velocity parameter ($v_i$) may be expressed as Equation (2):

$$v_i = \sqrt{\left(\frac{v_{i-1}^2}{2 \cdot a_{max}} + |p_i^{remain}|\right) \cdot \frac{2 \cdot a_{max} \cdot d_{max}}{a_{max} + d_{max}}} \qquad \text{Eq (2)}$$

Wherein, i is index value of processing segments 21, $v_{i-1}$ is the processing velocity parameter of the previous processing segment, $a_{max}$ is an allowed maximum acceleration, $d_{max}$ is a allowed maximum deceleration, $p_i^{remain}$ is a segment length of the present processing segment 21.

Figure 2:
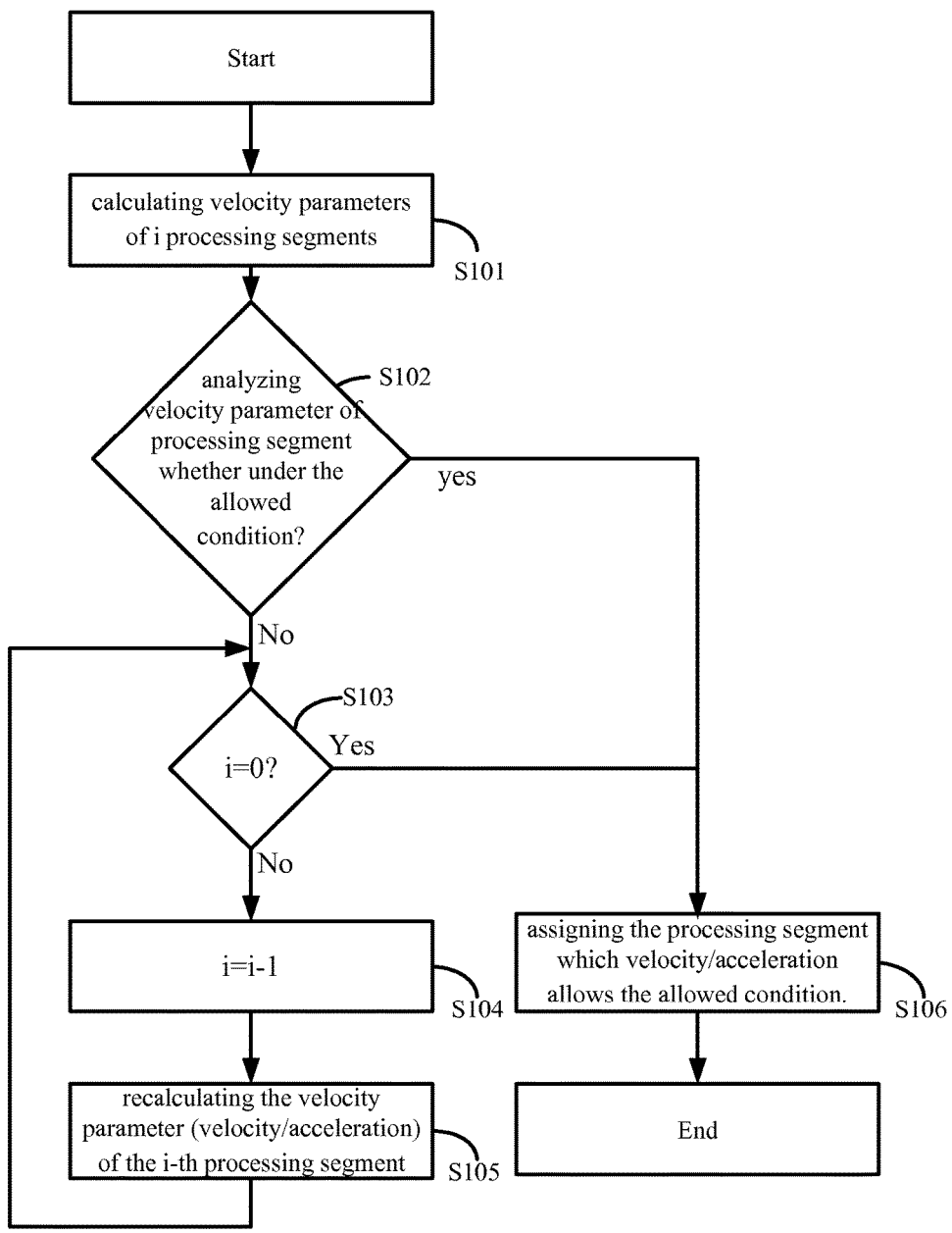
FIG. 2 shows a flow chart of the planning trajectory optimizing method of present application.

The present application may select blending algorithm, look-ahead algorithm, or look-backward algorithm to optimize the processing setting of the whole processing path. The optimizing operation is shown in FIG. 2. To avoid the outputting setting parameter of trajectory planning device 1 exceeds the operation parameter of CNC machine 3 (e.g. the velocity setting parameter exceeding the maximum processing velocity of the CNC machine), the trajectory planning device 1 further checks the velocity setting of whole segments whether complies the segment property when executing the optimizing operation procedure. For example, while processing segment 21 is a curved segment, the trajectory planning device 1 determines the processing velocity $V_i$ whether following the limitation of tangent velocity $V_t$. If the processing velocity comply the limitation, then check the next sequence processing segment 21. If the processing velocity do not comply the limitation, then recalculate the processing velocity of present processing segment.

The optimizing operation procedure is expressed as following steps:

S101: calculating velocity parameters of i processing segments 21.

S102: analyzing velocity parameter of processing segment 21 (e.g. tangent velocity $V_t$, normal velocity $V_n$, tangent acceleration $a_t$, or normal acceleration $a_n$) whether complying the allowed condition? (Yes, executing S106; No, executing S103)

S103: recalculating the i-th processing segment 21 to the first processing segment, and determining i=0? (Yes, executing S106; No, executing S104)

S104: i=i−1.

S105: calculating the velocity parameter (velocity/acceleration) of the i-th processing segment 21.

S106: assigning the processing segment which velocity/acceleration comply the allowed condition.

END.

In another embodiment, aforementioned tangent acceleration ($a_t$) may be expressed in Equation (3):

$$a_t = \frac{V_{(i)} - V_{(i-1)}}{TA} \qquad \text{Eq (3)}$$

Wherein, TA is acceleration time, $V_{(i)}$ is a velocity value of the present processing segment, and $V_{(i-1)}$ is a velocity value of the previous processing segment.

The aforementioned normal acceleration ($a_n$) is expressed in Equation (4), as follows:

$$a_n = \frac{V_{(i)t}^2}{R} \qquad \text{Eq (4)}$$

Wherein R is the curvature radius of the curved segment, $V_{(i)t}$ is a tangent velocity vector of the curved segment.

The present application further provides a second embodiment providing a trajectory planning method for configuring the processing trajectory. The aforementioned method includes the step of configuring the processing velocity or the processing acceleration of a related processing segment according to segment type of the processing segment, and then providing a processing trajectory.

Aforementioned method further determines the processing segment whether a linear segment or curved segment so as to configure the tangent acceleration or normal acceleration of related processing segment.

The forementioned method further determines if the processing segment is curved, and then configures the normal acceleration of the processing segment. The normal acceleration is configured by the tangent acceleration of the curved segment and curvature radius.

The aforementioned method further configures the processing velocity parameter of present processing segment according to the velocity parameter of previous processing segment and present processing segment.

The aforementioned method further analyzes the processing velocity to determine whether to comply an allowed condition so as to configure the tangent acceleration or normal acceleration of the processing velocity.

The present application further provides a third embodiment providing a computer program product for configuring the processing trajectory wherein the computer device loads and executes the computer program product so then the computer device is able to accomplish steps of the second embodiment.

The present invention further provides a forth embodiment providing a trajectory planning configuring system which integrates computer numerical control (CNC) machine. The system comprises aforementioned trajectory planning device 1, and a CNC machine. The CNC machine may adopt the Gantry Hybrid CNC which has multiple processing axes (x, y, v), however the type of CNC machine is not limited as aforementioned type. The trajectory planning device 1 connects with the CNC machine, and configures the CNC to execute the processing operation according to the processing setting.

Figure 3:
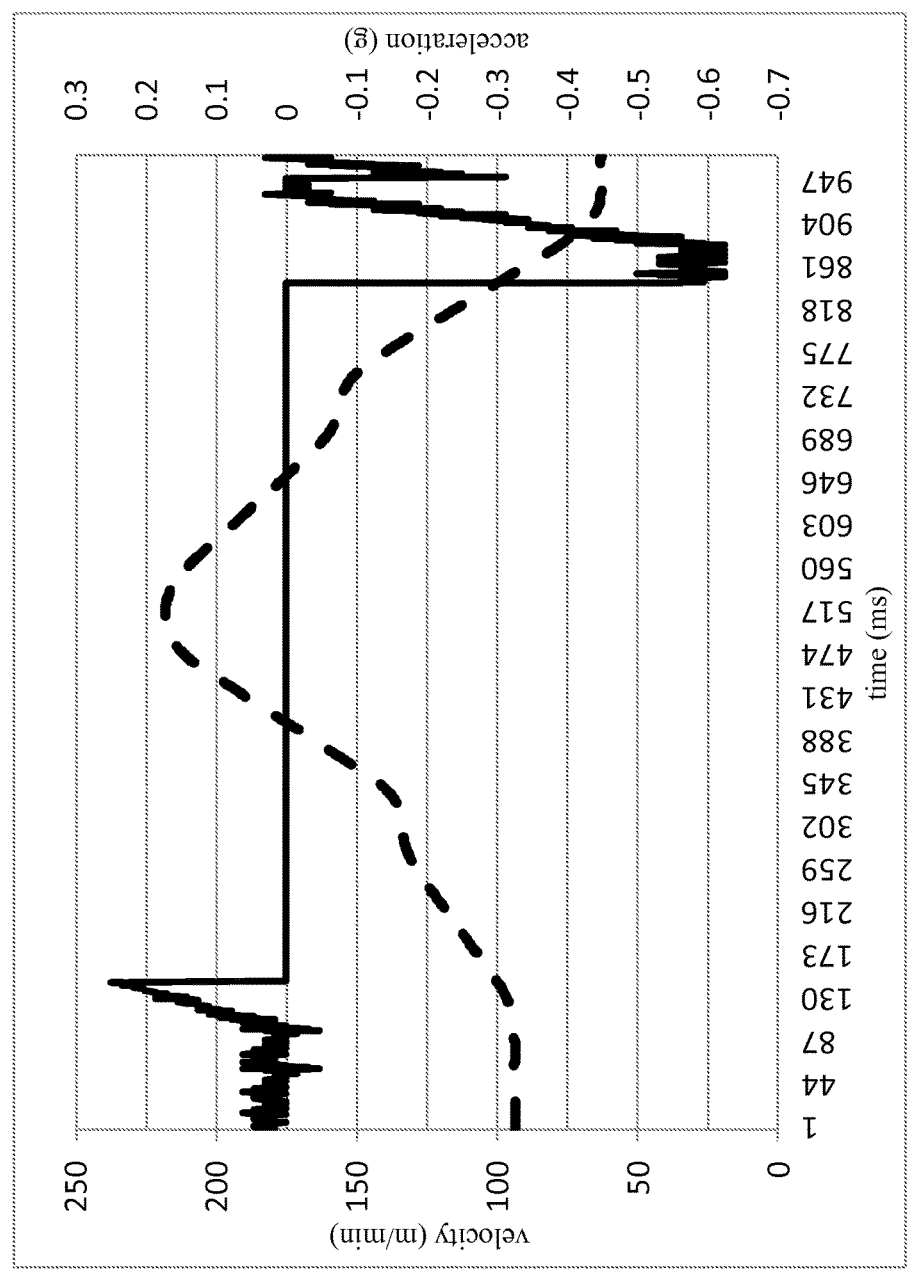
FIG. 3 shows a processing velocity/acceleration diagram of the processing trajectory of the prior art.

FIG. 3 shows processing velocity (dotted line) and acceleration (solid line) diagram of the processing trajectory of prior art. Because the prior art controller is unable to plan velocity and acceleration of whole processing segments, when the prior art controller executes the complex processing operation, the processing trajectory has to coordinate with the type of processing segment. Therefore, the CNC machine needs to frequently adjust acceleration or deceleration during the processing period, and causes a large number of velocity variations which affects the producing quality, and extends the producing time. As shown in FIG. 3, because the portion acceleration of the prior art has considerable variations, the CNC machine needs to adjust the processing velocity, and makes the maximum velocity to approach only 218 m/min.

Figure 4:
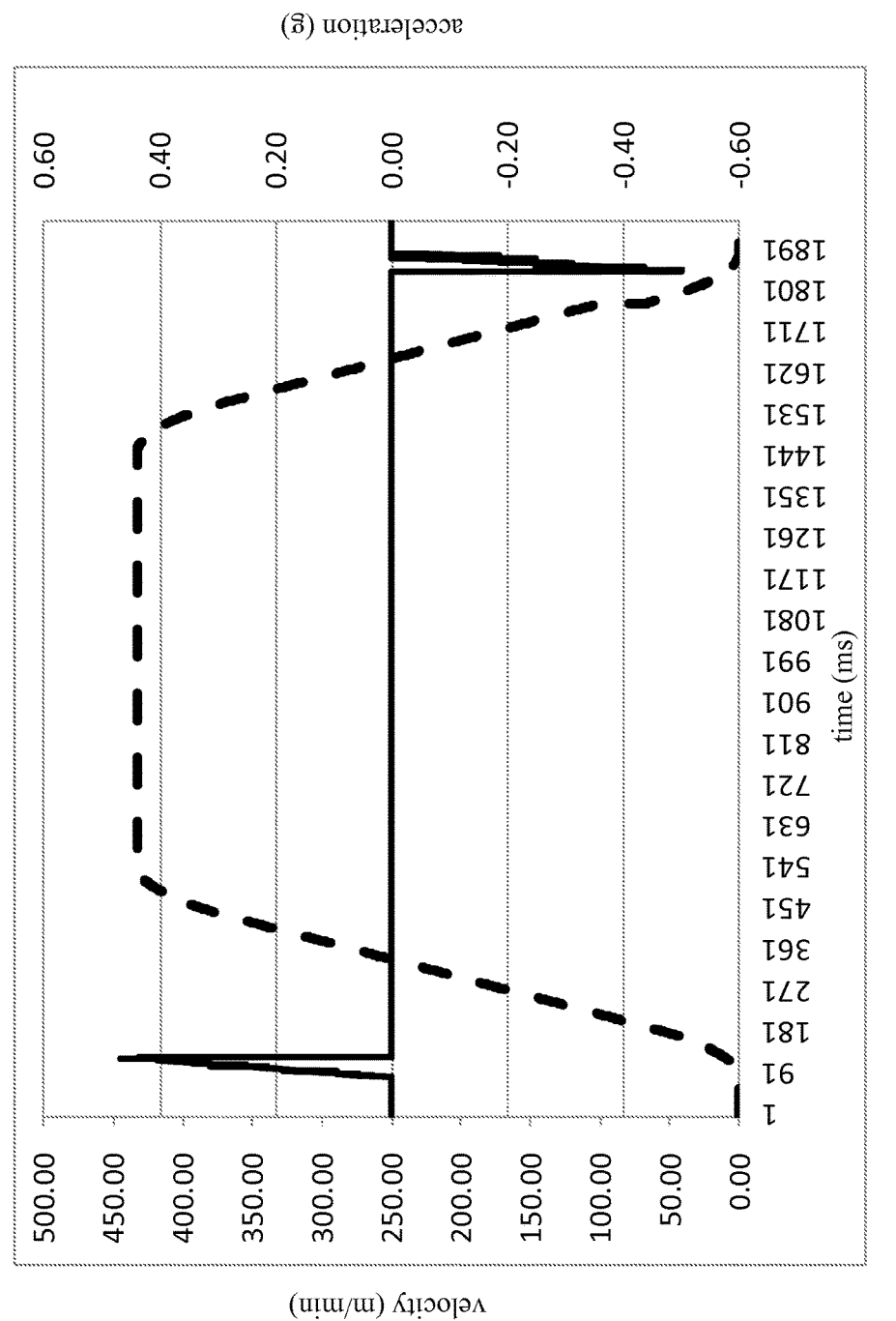
FIG. 4 shows a processing velocity/acceleration diagram of the processing trajectory of present application.

FIG. 4 shows processing velocity (dotted line) and acceleration (solid line) diagram of the processing trajectory of present application. Because the trajectory planning device 1 can sequentially checks and optimizes velocity or acceleration of processing segments 21 before assigning the processing setting to the CNC machine. Therefore, the acceleration curve of processing trajectory of present application is smooth than the acceleration curve of prior art (FIG. 3). The maximum processing velocity of present application can approach to the 433 m/min. Comparing with the prior art, the trajectory planning device and CNC machine thereof of present application without frequently adjusts the velocity, balances the accelerating requirement and smoothly trajectory, and has faster processing velocity. Therefore, the processing quality and manufacturing speed are superior to the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the appended claims.

What is claimed is:

1. A trajectory planning device for configuring a processing setting comprising computing hardware of an integrated computer numerical control machine executing a processing trajectory to configure a processing setting further comprising:
    dividing a processing path to a plurality of processing segments;
    configuring a processing velocity parameter of a related processing segment according to a segment type of the processing segment so as to provide a processing setting;
    determining whether the segment type is a linear segment or a curved segment so as to configure a related tangent acceleration or a normal acceleration;
    determining whether the segment type is the curved segment; and
    configuring the normal acceleration of the processing segment, wherein the normal acceleration is configured by the tangent acceleration and a curvature radius of the curved segment
    further comprising recalculating the processing velocity parameter of the present processing segment according to the processing velocity parameter of the previous processing segment and the processing velocity parameter of the present processing segment, wherein the recalculating of the processing velocity parameter ($v_i$) of the present processing segment is expressed as:

$$v_i = \sqrt{\left(\frac{v_{i-1}^2}{2 \cdot a_{max}} + |p_i^{remain}|\right) \cdot \frac{2 \cdot a_{max} \cdot d_{max}}{a_{max} + d_{max}}}$$

wherein, i is an index value, $v_{i-1}$ is the processing velocity parameter of the previous processing segment, $a_{max}$ is an allowed maximum acceleration, $d_{max}$ is a allowed maximum deceleration, $p_i^{remain}$ is a segment length of the present processing segment;
    further comprising analyzing whether the processing velocity parameter matches an allowed condition so as to reconfigure the tangent acceleration or the normal acceleration of the processing segment,
    wherein the trajectory planning device further checks a velocity setting of a whole segment to determine whether the velocity setting complies with the segment property when executing an optimizing operation procedure, the trajectory planning device further checks the velocity setting of the whole segment to determine whether the velocity setting complies with the segment property when executing the optimizing operation procedure, the optimizing operation procedure comprises the following steps:
    calculating velocity parameters of i processing segments;
    analyzing velocity parameter of processing segment;
    recalculating the i-th processing segment to the first processing segment,
    determining i=0;
    assigning the processing segment which velocity/acceleration comply the allowed condition when i=0;
    determining i=i−1 when i≠0;
    calculating the velocity parameter of the i-th processing segment when i≠0.

2. The device as claimed in claim 1, wherein the normal acceleration ($acceleration_{normal}$) is expressed as:

$$acceleration_{normal} = \frac{\|\overset{\vee}{v} \cdot e_t^2\|}{\rho}$$

wherein v is a tangent velocity of the curved segment, ρ is the curvature radius of the curved segment, $e_t$ is a unit vector at a tangent direction of the curved segment.

3. The device as claimed in claim 1, wherein an allowed acceleration ($a_t$) of the tangent acceleration is expressed as:

$$a_t = \frac{V_{(i)} - V_{(i-1)}}{TA}$$

wherein, TA is acceleration time, $V_{(i)}$ is a velocity value of the present processing segment, $V_{(i-1)}$ is a velocity value of the previous processing segment.

4. The device as claimed in claim 3, wherein an allowed acceleration value ($a_n$) is expressed as:

$$a_n = \frac{V_{(i)t}^2}{R}$$

wherein, R is the curvature radius of the curved segment, $V_{(i)t}$ is a tangent velocity vector of the curved segment.

5. A trajectory planning configuring system for an integrated computer numerical control machine, comprising:
   a computer numerical control machine; and
   a trajectory planning device as claimed in claim 1, wherein the trajectory planning device connects with the computer numerical control machine, and the trajectory planning device according to the processing setting configures the computer numerical control machine executing the processing operation.

\* \* \* \* \*